UNITED STATES PATENT OFFICE.

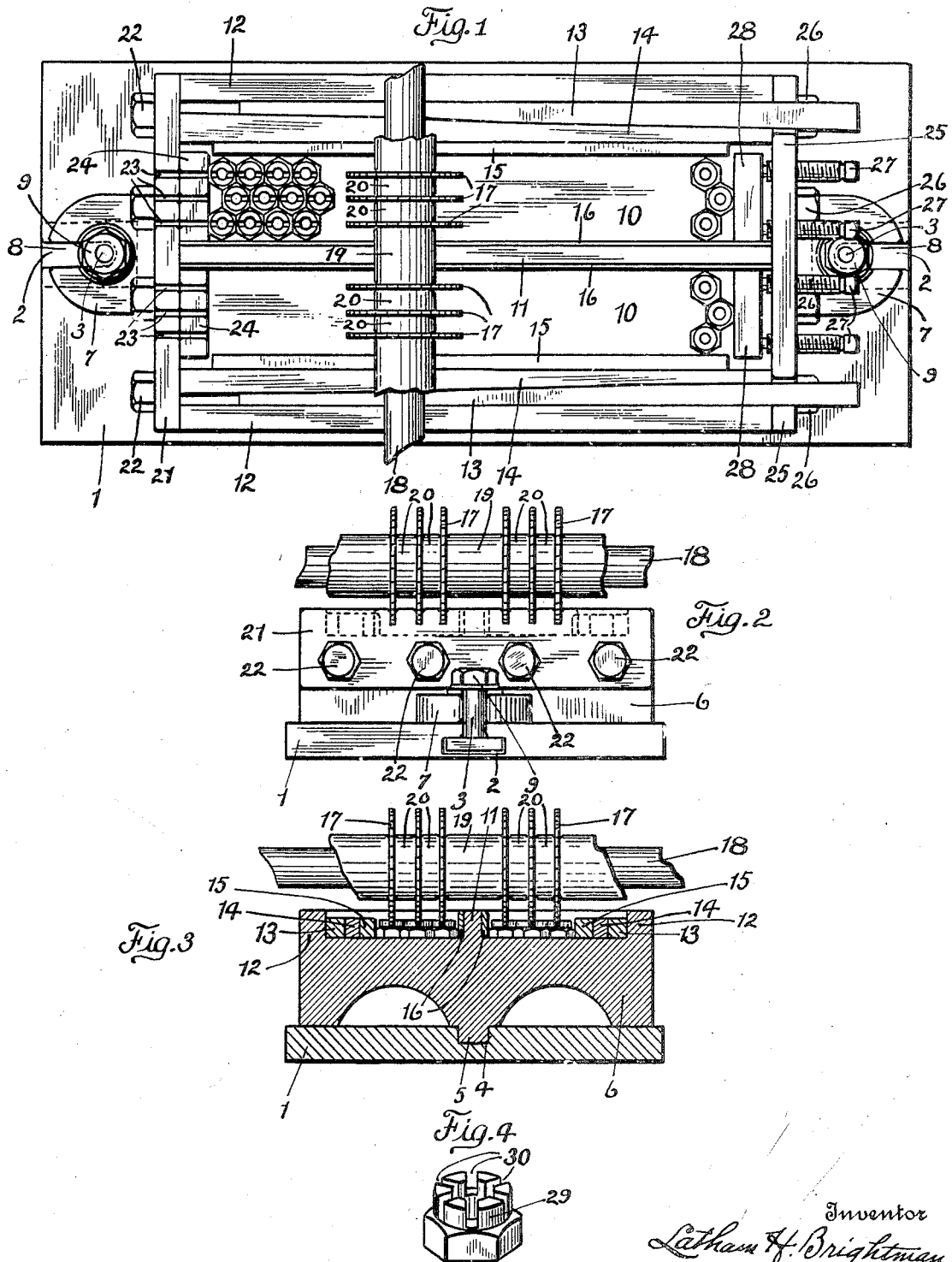

LATHAM H. BRIGHTMAN, OF COLUMBUS, OHIO.

CHUCK FOR NUT-MAKING MACHINES.

1,197,436.     Specification of Letters Patent.     Patented Sept. 5, 1916.

Application filed August 27, 1915. Serial No. 47,576.

*To all whom it may concern:*

Be it known that I, LATHAM H. BRIGHTMAN, a citizen of the United States, residing at Columbus, in the county of Franklin and State of Ohio, have invented certain new and useful Improvements in Chucks for Nut-Making Machines, of which the following is a specification.

My invention relates to machines for making nuts and is particularly directed to an improved type of chuck to be used in connection with these nut making machines.

More specifically, the main object of my invention resides in the provision of a novel type of chuck designed for use in the production of castellated nuts.

Great care must be taken in the manufacture of these castellated nuts in order that the slots are all uniform and further that they are all radially arranged. The present invention has relation to these types of machines employing cutters whereby these slots are cut into the crown portion of the nut previously formed.

Another object of my invention resides in the specific arrangement of a stationary gage used in connection with this chuck, this gage being carried by and extending longitudinally of the chuck itself in order that the nuts spaced on either side of it may have a stationary gage against which they are made to abut when being assembled. This gage is provided in order to reduce the chance of variation in the positioning of the slots in the various nuts to a minimum and is further provided so that the complete array of nuts will not buckle and work out of true position when they are clamped in connection with the chuck. This arrangement of the longitudinally extending or centrally disposed gage member, serves the purpose of presenting a type of chuck wherein the nuts may be readily turned or adjusted to assume their various positions with respect to the cutter by the workmen, it requiring less skill and also less time and labor to reassemble the distinct groups of nuts than it would if the entire mass were confined to one group.

The preferred embodiment of my invention is shown in the accompanying sheet of drawings, in which similar characters of reference designate corresponding parts, and in which:

Figure 1 is a plan view showing my improved type of chuck in connection with a set of rotary cutters, Fig. 2 is an end view of the structure shown in Fig. 1 and looking from the left, Fig. 3 is a transverse cross section of the structure shown in Fig. 1, and, Fig. 4 is a view in perspective of a type of nut produced by the mechanism shown in the foregoing figures.

In these several views, there is shown a bed plate 1 upon which the chuck as a whole, is removably mounted by means of the end slots shown at 2 carrying upstanding bolts 3. This bed plate is also provided with a longitudinally extending groove 4 to receive a projecting tongue 5 carried by the underside of the chuck body portion 6 in order that this chuck may always be properly alined with respect to the bed plate when it is placed in position. The bolts 3 are designed to coöperate with outwardly projecting ears 7 carried by each end of the chuck body and slotted, as shown at 8, in order to slidably receive the bolts and by means of this slot and ear are further held in clamped position through the medium of the nut and washer structure shown at 9. The top face of this chuck is formed with a counter-sunk portion divided into two spaces 10 by means of a longitudinally extending gage strip 11. This gage strip is preferably centrally disposed with respect to the chuck body and extends from one end thereof to the other. The other two longitudinal edges of the chuck body are provided with abutments arranged in parallelism with the gage strip 11 and formed of upstanding side ribs 12 and coöperating with the strips 13 and 14. These wedge strips are so mounted that their inclined faces abut and they, therefore, serve as a means for adjusting the side portions of the inclosures for the spaces 10, back and forth to move the nuts into clamping engagement with the central gage strip. This adjustment is effected by driving the wedge strip 13 farther into position after the manner shown in Fig. 1, whereby the wedge strip 14 will be moved in a direction toward the central gage strip 11. While I have shown and described this specific type of side adjustment, I do not desire to limit myself to this specific construction, as other types of adjusting means are well adapted to serve the same purpose. In order that the wedge strips 14 and also the central gage strip 11 may not become unnecessarily worn or notched by repeated engagement with the sharp corners of the nuts, I have faced each of these with facing strips 15 and 16 respectively. It will be understood that the thickness of the facing strips 16 may also be such to coöperate in properly alining the assembled nuts with respect to the cutters shown at 17. These cutters are mounted on a transverse spindle 18 and are all properly spaced by means of spacer sleeves 19 and 20 to aline centrally with the various lines of nuts held in position as shown in Fig. 1.

The left hand end of the chuck body is provided with a removable end piece 21 held in position by the nuts 22. This end piece is also suitably slotted as is shown at 23 to agree with the spacing of the cutters 17. End facings 24 are also provided to abut this end piece 21 as is shown and these end pieces are slotted similarly to the arrangement of slots in the end piece, so that the cutters may be moved into an operative position to cut the slots shown in the nuts without first having to cut their way through the end frame of the chuck itself. The opposite or right hand end of the chuck, as shown in Fig. 1, is provided with an end piece 25 removable by means of the bolts 26 and also drilled and tapped to receive the adjusting screws 27. These latter screws coöperate to properly adjust the end facings shown at 28, to securely hold the assembled nuts against movement in this direction.

In Fig. 4, the type of nut made by my machine is shown, the crown portion 29 being provided with a series of three notches 30 all equally spaced to form the projecting lugs, as shown. The nuts are suitably arranged in the spaces 10 and are then clamped in this position by driving the wedges 13 against the wedges 14. This holds the nuts rigid laterally and in order to hold them rigid longitudinally of the machine, the end facings 28 are adjusted under the influence of the adjusting screws 27 until the entire array is made to assume the position corresponding to that shown at the left of Fig. 1. The cutters 17 are then set into operation and a cut taken longitudinally through the entire array of nuts. After this is completed, the nuts are unclamped and rearranged so that a second cut may be taken and after its completion they are again rearranged for the third and final cut. By means of the central gage strip 16, the liability of the mass of nuts buckling under the clamping influence of the wedges is reduced to a minimum and also any slight variation in the size of these nuts will not increase to such proportions as to render them useless, because instead of having six nuts arranged side by side as shown in Fig. 1, there are two sets of three with the central portion as the gage mark for determining the positions of the cutters 17. Also, less skill and less time is required to rearrange two sets of nuts arranged in three strands side by side, than would be the case where this number is doubled. For this reason I have employed the substantially central stationary gage and two side adjustments working toward this gage.

What I claim, is:

1. In a castellating nut machine, a bed plate, a chuck mounted thereon, a stationary gage on and extending longitudinally of said chuck against which the nuts are to abut, means adjustable to force the nuts into engagement with the gage, a cutter arranged to aline centrally with each row of nuts held by the chuck, and a removable end for said chuck whose top is slotted to aline longitudinally with each of said cutters.

2. In a castellating nut machine, a bed plate, a chuck removably mounted thereon, a stationary gage on and extending longitudinally of said chuck against which the nuts are to abut, an abutment located on each longitudinal side of said gage adjustable to force the nuts into engagement with the gage, abutments on each end of said chuck and on each side of said gage and against which the nuts are to abut, means for adjusting the abutments on each side of said gage toward and away from each other, a cutter arranged to aline centrally with each row of nuts held by the chuck and a removable end piece for one end of said chuck slotted to aline longitudinally with said cutters.

3. In a castellating nut machine, a bed plate, a chuck removably mounted thereon, a stationary gage on and extending longitudinally of said chuck against which the nuts are to abut, an abutment located on each longitudinal side of said gage, means for adjusting said abutments to force the nuts into engagement with said gage, removable facings for each of said abutments and for each side of said gage, a removable end piece for the chuck slotted to aline centrally with each row of nuts held by the chuck, an abutment on the other end of said chuck, means for adjusting said last named abutment back and forth to force the nuts into engagement with said end piece, a spindle extending transversely of said chuck, cutters on said spindle, and spaces located between said cutters to space them to cause them to aline with the slots in said end piece.

In testimony whereof I affix my signature in presence of two witnesses.

LATHAM H. BRIGHTMAN.

Witnesses:
C. C. SHEPHERD,
WALTER E. L. BOCK.